US008317226B1

(12) United States Patent
Wong

(10) Patent No.: US 8,317,226 B1
(45) Date of Patent: Nov. 27, 2012

(54) FOUNDATIONLESS POLE INSTALLATION SYSTEM

(76) Inventor: Thomas K. Wong, San Francisco, CA (US)

( * ) Notice: Subject to any disclaimer, the term of this patent is extended or adjusted under 35 U.S.C. 154(b) by 257 days.

(21) Appl. No.: 12/804,024

(22) Filed: Jul. 13, 2010

(51) Int. Cl.
*B60R 9/06* (2006.01)

(52) U.S. Cl. ........................................................ 280/769

(58) Field of Classification Search .................. 280/769, 280/47.34, 47.35, 63, 47.131, 47.19, 645, 280/651, 652; 248/159, 357; 52/115, 116, 52/117, 120, 122.1, 123.1; 414/23
See application file for complete search history.

(56) References Cited

U.S. PATENT DOCUMENTS 639,286 A 12/1899 Prevost
2,792,948 A 5/1957 De Shano
3,112,037 A 11/1963 Thiermann
3,190,465 A 6/1965 Newman
3,236,398 A * 2/1966 Thiermann ..................... 414/23
3,267,627 A 8/1966 Hammitt
3,315,976 A * 4/1967 Thiermann ................... 280/103
3,680,448 A 8/1972 Ballingall et al.
3,792,980 A 2/1974 Vollmer et al.
3,820,906 A 6/1974 Katt
3,895,471 A 7/1975 Kolb
3,941,083 A * 3/1976 Morse et al. .................. 116/173
4,079,559 A 3/1978 Tenbrummeler
4,114,766 A 9/1978 Decker et al.
4,311,324 A * 1/1982 Fries ............................. 280/810
4,362,451 A * 12/1982 Thiermann, Sr. ............... 414/23
4,492,496 A 1/1985 Arnold
4,926,592 A 5/1990 Nehls
5,058,336 A 10/1991 Jenvey
5,248,157 A * 9/1993 Rice ......................... 280/47.131
5,476,352 A 12/1995 Culbertson et al.
5,634,759 A 6/1997 Jenvey
5,782,040 A 7/1998 McCartan
5,794,378 A 8/1998 Beatrez
5,899,651 A 5/1999 Jenvey
5,927,925 A * 7/1999 Winkelmann .................. 414/23
6,191,355 B1 2/2001 Edelstein
6,216,414 B1 4/2001 Feldberg
6,264,162 B1 7/2001 Barnes et al.
6,322,038 B1 11/2001 Ghahremani
6,390,436 B2 5/2002 Barnes et al.
6,399,881 B2 6/2002 Edelstein
6,428,242 B1 8/2002 Ward
6,709,215 B1 3/2004 Sorensen
6,851,231 B2 2/2005 Tadros et al.
6,955,025 B2 10/2005 Dehlsen et al.
7,267,516 B1 9/2007 Sorensen
7,275,351 B2 10/2007 Knepp
7,866,927 B1 * 1/2011 Wong ............................. 411/23

OTHER PUBLICATIONS

U.S. Appl. No. 12/152,319, filed May 13, 2008, Wong.

* cited by examiner

*Primary Examiner* — John Walters
*Assistant Examiner* — James Triggs
(74) *Attorney, Agent, or Firm* — Thomas R. Lampe

(57) ABSTRACT

A pole installation system employing a pole, a base member connected to the pole having a pivot edge segment forming a stable support pivot, and counter weight structure incorporated in or connected to the base member for countering forces exerted by gravity on the pole during tilting of the pole and base member.

35 Claims, 5 Drawing Sheets

FOUNDATIONLESS POLE INSTALLATION SYSTEM

TECHNICAL FIELD

This invention relates to a pole installation system which is applicable when installing poles of various types, without requiring use of foundations or anchor poles. The system incorporates a pole of unique character incorporating a pole, a base member attached to the pole having a pivot edge segment, and counterweight structure at least partially countering gravity forces exerted on the pole during tilting of the pole about a stable support pivot formed by the pivot edge segment.

BACKGROUND OF THE INVENTION

As pointed out in my co-pending U.S. patent application Ser. No. 12/152,319, filed May 13, 2008, there are many types of poles for a wide range of applications, such as streetlights, fence posts, flagpoles, utility poles and sign poles. The term poles as used herein encompasses both relatively short poles, commonly called posts, as well as poles of greater length.

The current methods of pole installation can be grouped into 3 categories. (1) The simplest category involves driving a pole into the ground with a post driver; it is commonly used for installing short sign poles and fence poles. (2) The second category requires digging a hole into the ground first, the pole then being placed into the hole, and native soil compacted around the pole. Instead of using compacted soil, expandable foam, cement or concrete are also commonly used to secure the pole inside the hole. This method is used in many applications such as fence posts, flagpoles, utility poles and tall sign poles. The installation cost is higher than the first approach, but it is currently the cheapest way to install tall poles. (3) The third approach is to build a reinforced concrete foundation with anchor bolts or other fasteners protruding from the top of the concrete foundation for pole attachment. A hole in the ground is still needed to embed the concrete foundation. With this approach, the pole is set on top of the foundation. Tall poles or poles requiring strong base connection typically use this third approach; examples include tall street lamps, utility poles and flagpoles. This is the costliest of the three methods, but is also the strongest for heavy loading. When electrical wires are required, such as for street lamps, conduit is embedded into the concrete foundation or introduced underground from a side of the pole. Once wires are pulled inside the base of the pole, wire connection is done through a "hand hole" at the bottom of the pole. These prior art approaches have been practiced for many years and are effective in many ways. However, they do have limitations and shortcomings as listed below:

The installation practice of Category 1 is simple, efficient and low cost. A major drawback is the limited length of the pole it can handle. It is difficult and not safe to drive a tall pole into the ground, and some poles such as flagpoles are not designed for driving.

The installation approach of Category 2 can handle tall poles of various types. The installation cost is higher than Category 1. Except for very small poles, it requires at least two people and often includes auger and lifting equipment to dig a deep hole and put the pole in place. Further, removing the pole will involve significant efforts and costs.

The approach of Category 3, in addition to the cost and time of a reinforced foundation, involves a second trip to install the pole after the concrete is set. In most cases, it requires at least a two-man crew, auger and lifting equipment. Pole removal is also very costly.

To simplify installation, and make pole servicing easier, it is known to employ a hinged base to allow easier raising and lowering of a pole. This is a variation of the Category 3 approach. U.S. Pat. Nos. 4,079,559 and 6,216,414 disclose two examples. In these examples, the pole connections to the base are very strong. U.S. Pat. No. 5,058,336 uses a cumbersome hydraulic ram to raise and lower a pole, and its base hinge connection is weak. Weaker materials such as wood will not work well for the pole base. Moreover, these prior art installations suffer the same problems as mentioned above in connection with Category 3.

The prior art installations in general are limited in efficiency and versatility. Many steps and resources are involved during installation. Since at least two people are often required, it is highly inefficient when installing small numbers of poles; driving time alone can be costly. A system allowing only one person installation can yield huge savings for small quantity jobs. Further, as removing poles installed using the prior art approaches is difficult, they are not efficient for temporary applications such as temporary power poles and temporary surveillance camera poles. Electrical wiring installation using the prior art systems is also rather clumsy. Maintenance, such as changing light bulbs, equipment or components thereof can also be challenging, since elevated equipment such as a bucket truck is often necessary. The hinged base poles are better for servicing, but their pole base installations are far from desirable.

The following prior art is believed to be further representative of the current state of the prior at in this field: U.S. Pat. No. 6,955,025, U.S. Pat. No. 7,275,351, U.S. Pat. No. 5,782,040, U.S. Pat. No. 3,680,448, U.S. Pat. No. 6,390,436, U.S. Pat. No. 6,264,162, U.S. Pat. No. 3,267,627, U.S. Pat. No. 3,820,906, U.S. Pat. No. 6,428,242, U.S. Pat. No. 3,792,980, U.S. Pat. No. 4,926,592, U.S. Pat. No. 6,851,231, U.S. Pat. No. 6,399,881, U.S. Pat. No. 6,191,355, U.S. Pat. No. 3,895,471, U.S. Pat. No. 7,267,516, U.S. Pat. No. 6,709,215, U.S. Pat. No. 5,899,651, U.S. Pat. No. 5,634,759, U.S. Pat. No. 5,794,378, U.S. Pat. No. 6,322,038, U.S. Pat. No. 3,112,037, U.S. Pat. No. 639,286, U.S. Pat. No. 5,476,352, U.S. Pat. No. 4,362,451, U.S. Pat. No. 4,492,496, U.S. Pat. No. 3,190,465, U.S. Pat. No. 4,114,766 and U.S. Pat. No. 2,792,948.

The pole installation system of my above-identified co-pending U.S. patent application addressed a number of shortcomings of other pole systems and is particularly useful for installing heavy poles quickly by one person. However, it requires the installation of an anchor pole in the ground, and equipment for large hole drilling or post driving is needed. For tall poles, the embedment depth of the anchor poles usually has to be very deep.

DISCLOSURE OF INVENTION

The subject invention, in common with that disclosed in my U.S. application Ser. No. 12/152,319, has the capability of allowing for pole installation quickly by one person, but without the need for any foundations or anchor poles. Thus the system can be easily installed at any existing concrete or asphalt surfaces, as well as in hard rock or poor soft soil conditions. Moreover, even for heavy tall poles, no crane, auger or post driver are needed. In one unique variation of this invention, even anchoring of the pole is not necessary for high wind conditions. In addition, this pole system can be easily relocated from place to place, an important benefit in certain applications. An example is when the pole system is used for mounting security cameras on a changing construction site where repositioning of the security equipment is necessary from time to time.

The invention includes pole installation apparatus allowing installation of a pole at a site without requiring use of foundations or anchor poles. The apparatus includes an elongated pole having an upper end, a lower end and a primary axis extending between the upper and lower ends.

A base member is attached to the lower end of the elongated pole for supporting the elongated pole. The base member includes an outer peripheral edge having a pivot edge segment forming a stable support pivot extending substantially orthogonally relative to the primary axis of the pole.

Counter weight structure is incorporated in or connected to the base member at a location spaced from the pivot edge segment for applying forces to the base member at least partially countering the forces exerted by gravity on the pole during movement of the pole between a vertical orientation and a horizontal orientation and tilting of the pole about the stable support pivot.

The system of the invention also relates to a method of installing an elongated pole having an upper end, a lower end and a primary axis extending between the upper and lower ends at a site without requiring use of foundations or anchor poles.

According to the method, a base member is attached to the lower end of the elongated pole for supporting the elongated pole, the base member including an outer peripheral edge having a pivot edge segment forming a stable support pivot extending substantially orthogonally relative to the primary axis of the pole.

Counter weight structure is provided, the counter weight structure incorporated in or connected to the base member at a location spaced from the pivot edge segment.

The counter weight structure is utilized to apply forces to the base member at least partially countering the forces exerted by gravity on the pole during movement of the pole between a vertical orientation and a horizontal orientation and tilting of the pole about the stable support pivot.

Other features, advantages and objects of the present invention will become apparent with reference to the following description and accompanying drawings.

MODES FOR CARRYING OUT THE INVENTION

Figure 1:
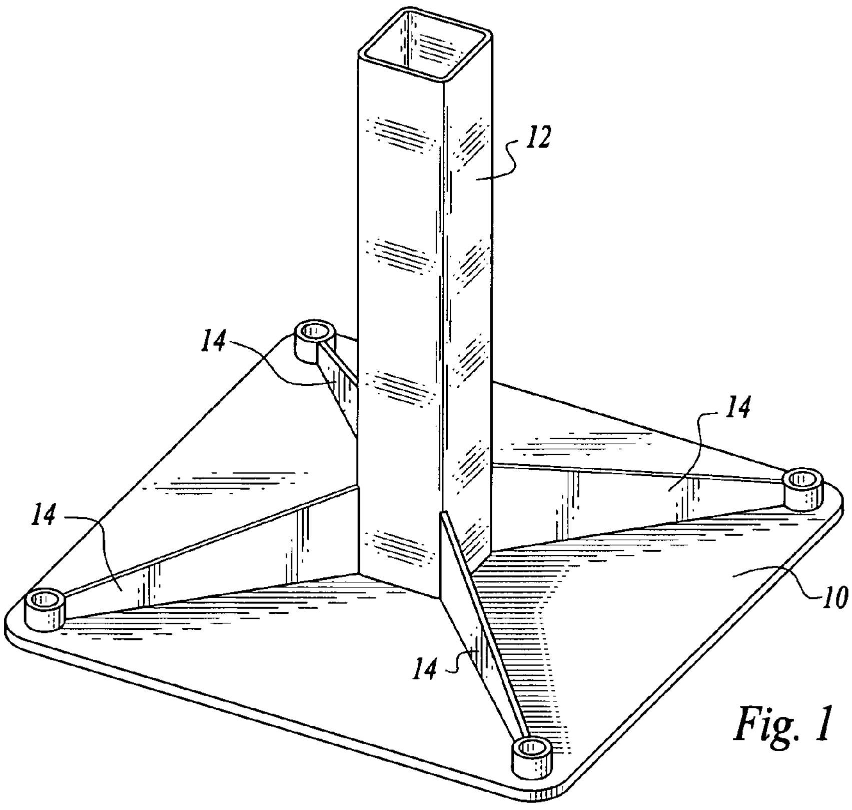
FIG. 1 is a perspective view of a base member constructed in accordance with the teachings of the present invention and including a rectangular shaped, enlarged base plate for supporting an elongated pole.
Figure 2:
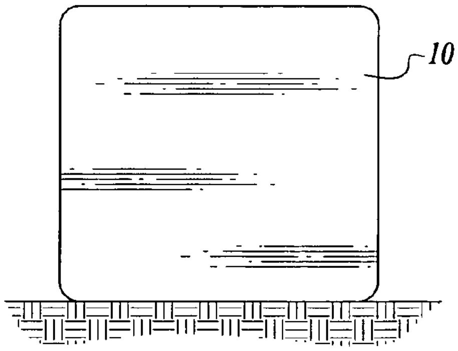
FIG. 2 is an elevational view of the bottom of the base plate tipped on edge and in engagement with the ground or other support surface.
Figure 10:
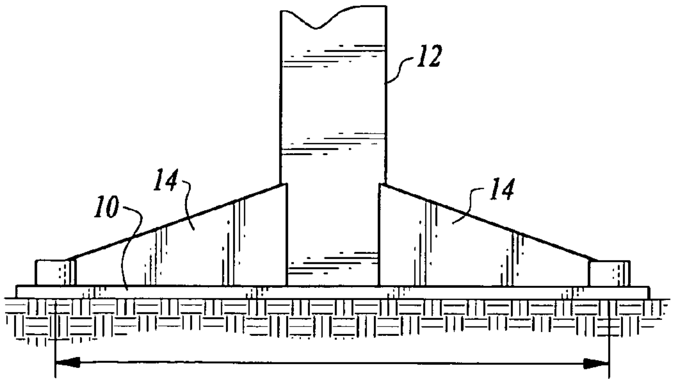
FIG. 10 is a side, elevational view illustrating the base plate and related structure of the embodiment of the invention shown in FIG. 1.

Referring now to FIGS. 1, 2 and 10, a component of this invention is a base member including base plate 10. Attached to base plate 10 is a pole base 12 which receives an elongated pole which is attached thereto by any desired expedient. Alternatively, the pole base may be integral with the rest of the pole. In either case, the pole base is considered herein to be part of the pole. The base member is wide as compared to the pole base 12. For a typical pole, reinforcement gussets or stiffener members 14 are welded between the pole base 12 and the plate 10 to effectively transfer lateral wind load on the pole and its equipment to the anchor bolts (not shown) located at the edges of plate 10.

Figure 3:
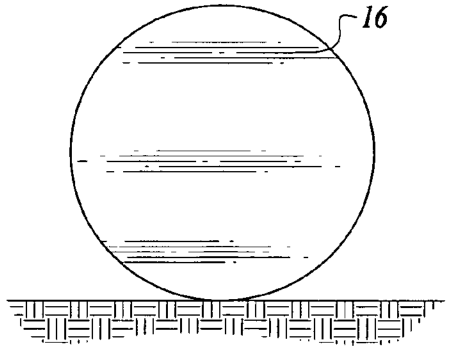
Fig. 3 (Prior Art)
FIG. 3 is a view similar to FIG. 2, but illustrating a conventional base plate having a circular configuration.

The pole can be any suitable shape. Round or square tubes are most common. The wide base plate can also be any shape except that it must have at least one flat edge that can act as a stable pivot. Otherwise, stabilizer attachments become necessary, as will be described below. For example, a rectangular or triangular shape base plate will work, but a round shaped base such as depicted by reference number 16 in FIG. 3 will not, unless part of its edge is truncated to create a needed flat edge or stabilizers are added for safe pivoting. See FIGS. 4 and 5, respectively. The flat pivot edge or pivot stabilizers are critical during raising or lowering of the pole. They stop the pole from rolling side-to-side, the only directions the pole can move being up or down, thus allowing safe installation of the pole system. In FIG. 1, a square pole and a square base plate is used for illustration.

Figure 4:
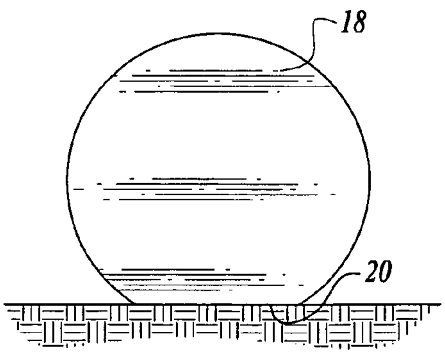
FIG. 4 is a view similar to FIG. 2, but illustrating an alternative form of base plate having a straight pivot edge segment.
Figure 5:
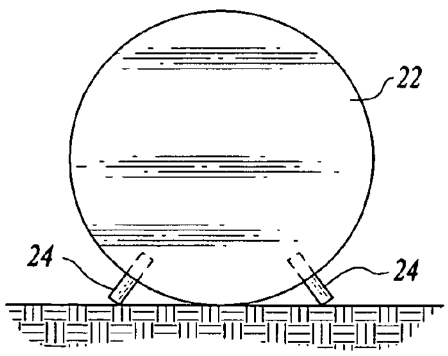
FIG. 5 is an elevational view illustrating a circular base plate, but having pivot stabilizers attached thereto, the base plate and stabilizers simultaneously engaging the ground or other support surface.

In FIG. 4 a round base member 18 is truncated so that the peripheral edge has a straight pivot edge segment 20 forming a stable support pivot extending orthogonally relative to the primary axis extending through the pole. In FIG. 5 the base member 22 is completely round. A pair of stabilizers 24 are spaced from one another and project beyond the peripheral edge of the base member. The curved portion of the base member 22 between the stabilizers forms a pivot edge segment. The stabilizers and the pivot edge segment have extremities which are aligned and cooperate to form a stable support pivot orthogonal to a pole primary axis.

Figure 6:
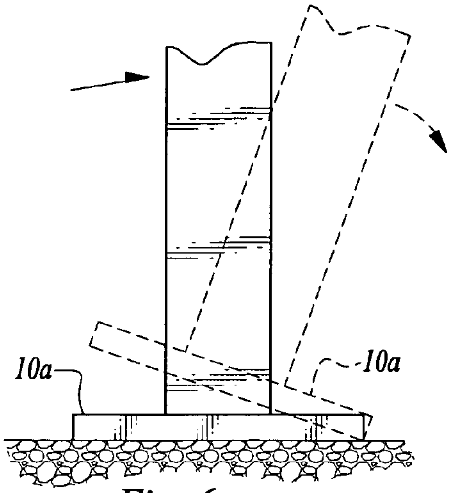
Fig. 6 (Prior Art)
FIG. 6 shows a prior art base plate for supporting a pole being tilted about an edge thereof.
Figure 9:
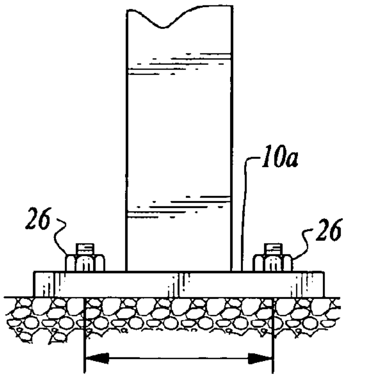
Fig. 9 (Prior Art)
FIG. 9 illustrates a base member similar to that shown in FIG. 6 attached to a foundation with anchor bolts and nuts.

Without anchor bolts, strong wind can push a pole on its side causing the pole and the base member to tilt or rotate along the downwind edge of the plate. See base plate 10*a* FIG. 6. Anchor bolts, such as bolts 26 shown in FIG. 9 in association with conventional, relatively narrow base plate 10*a*, counter the tilt rotation and hold the base member and pole in place. The wider the base, the wider the spacing for the anchor bolts, creating longer counter rotation moment arms, resulting in less load on the anchor bolts. This is in contrast to a conventional pole base in which the anchor bolts are closely spaced together, requiring large bolts for the large hold down force, as the moment arms for counter rotation are very short. See FIGS. 6 and 9 in this regard. As a result, a structural foundation supporting these high force anchor bolts is needed for the conventional poles.

When the base plate is wide enough to allow for creation of long moment arms to counter the uplift rotation, such as base plate 10, the forces on the anchor bolts are substantially reduced. See FIG. 10. With a wide base member or plate it becomes possible for a pole system to be mounted on almost any surface without a foundation since the hold down forces on the anchor bolts are so light that most surface materials can withstand the load.

Figure 7:
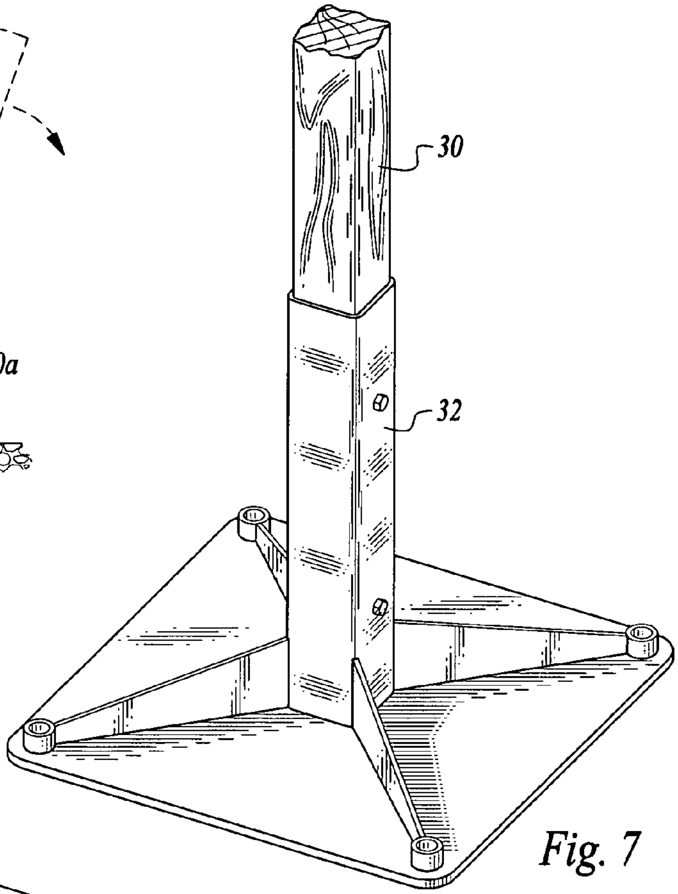
FIG. 7 illustrates an embodiment of the invention similar to that of FIG. 1 wherein a wooden pole segment, only a portion of which is illustrated, is being supported.

The pole and the base member need not be permanently attached together. For example, instead of an approach of welding a metal pole to a metal base, the pole and base member can be separate components made of different materials. FIG. 7 shows a wood post segment 30 received in and bolted to a metal pole base 32 welded to a base plate allowing inexpensive wood posts to be used in this innovative foundationless pole system.

Figure 8:
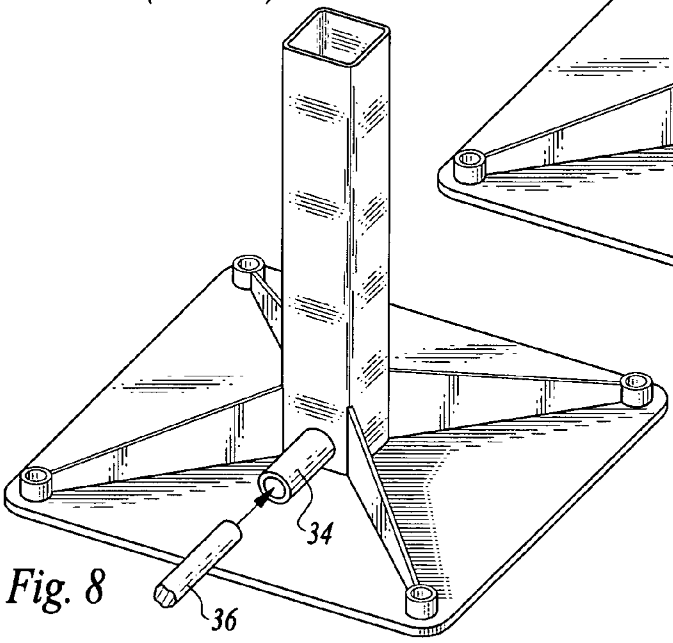
FIG. 8 discloses an embodiment of a base member similar to that of FIG. 1, but having a receptacle for receiving a counter weight arm, only a portion of the latter being illustrated.

To install this foundationless pole and base member combination, a second key feature is an innovative adaptive counter weight system. The counter weight of the system allows safe erection and lowering of a heavy pole by one person without the use of a crane of other hoisting devices. The mounting brackets or receptacles for the counter weight arm are integrated with the base member pole base. See FIG. 8 wherein an end of a counter weight and arm or rod 36 is shown being inserted in a connector receptacle 34 attached at the pole base.

Figure 11:
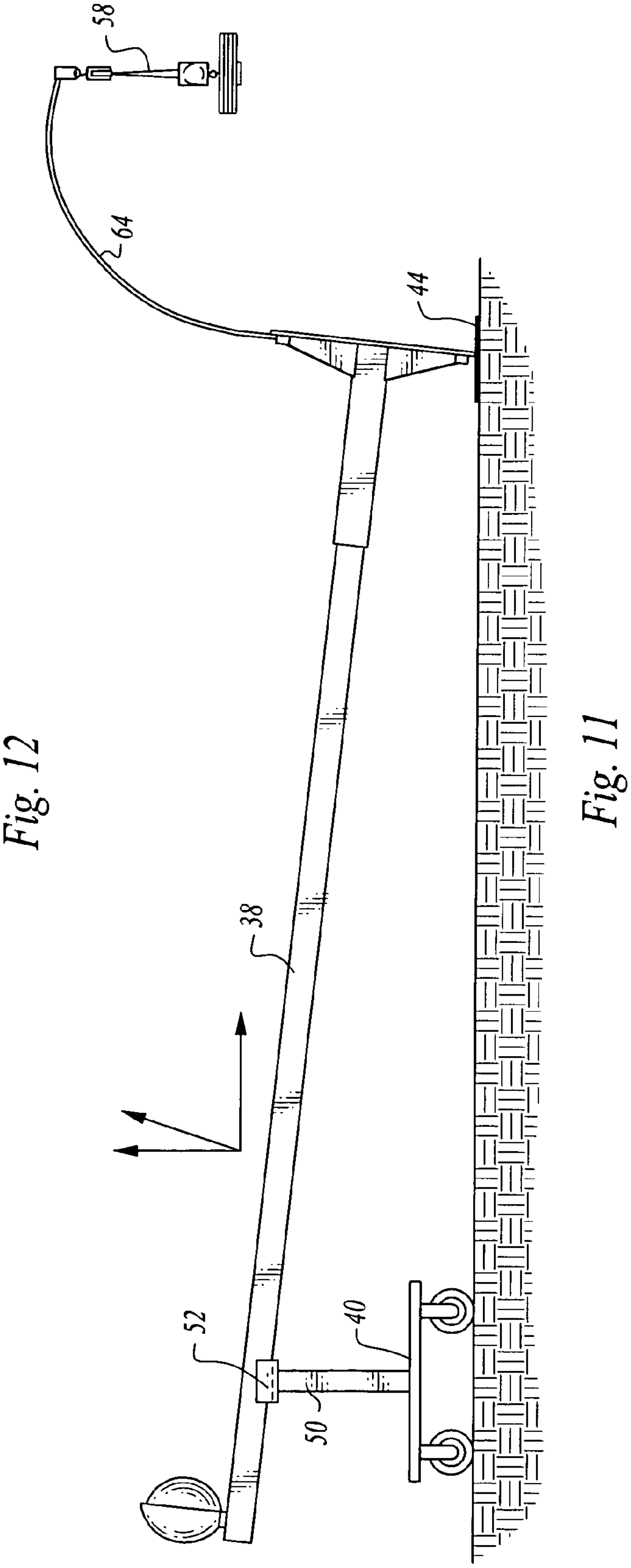
FIG. 11 is a side, elevational view of a pole connected to the base member of FIG. 8 along with a bendable counter weight arm which supports a counter weight, a dolly supporting the pole in an inclined orientation.

FIG. 11 shows the starting position of the counter weight system prior to erecting a pole 38. Also shown are two other supporting components: a pole dolly 40 and an anti-skid mat 44. The pole dolly, anti-skid mat, the adaptive counter weight system and pole installation procedures are described below.

Figure 12:
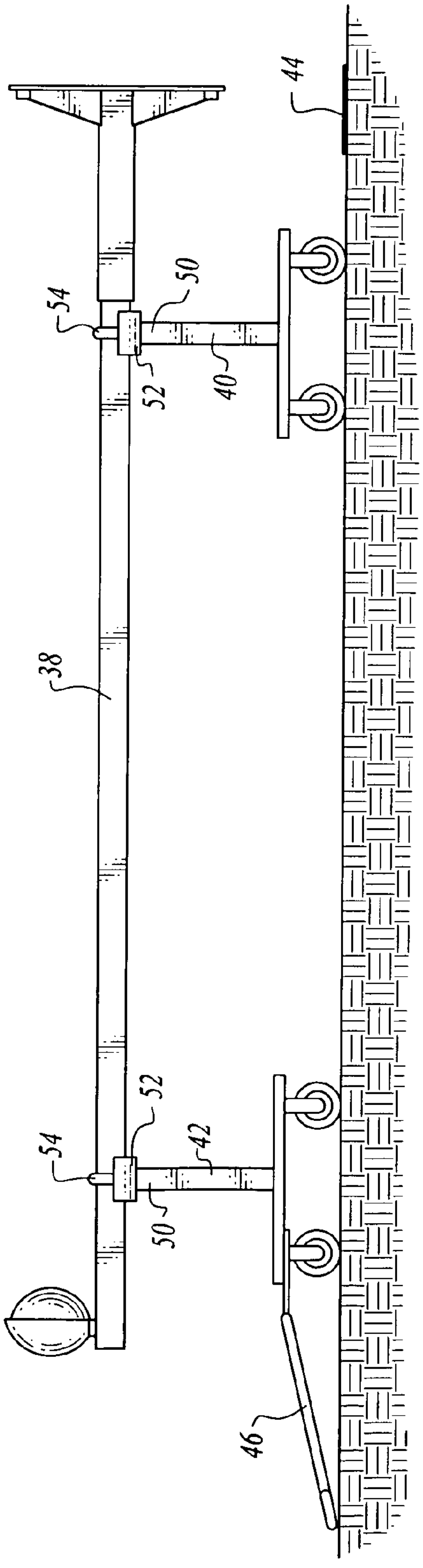
FIG. 12 is a side, elevational view illustrating a pole and base member supported in a horizontal orientation by two unconnected wheeled dollies.

To safely use a crane to hoist heavy materials, usually 2 persons are needed, one to operate a crane and one to guide the placement of materials. This invention avoids using this labor and equipment intensive approach. To move a heavy pole around without a crane, a transport vehicle is necessary. A pair of simple but effective pole dollies are created to serve as a transportation vehicle as well as an installation tool. See FIG. 12. The front dolly 42 has four swivel wheels, while the rear dolly 40 has only two swivel wheels in the front. Two fixed wheels are located in the rear. This configuration substantially prevents fish tailing and promotes movement control. The front dolly also has a hinged tongue 46 to facilitate low speed towing by a powered vehicle such as an ATV for rough terrains or long distance transport. A hinged tongue is necessary to prevent the dolly wheels from lifting from the ground on rough paths. For short distance travel, the tongue can be replaced by a handle bar for moving by hand, or one can simply push the pole and dolly assembly around directly.

At the center of each dolly is a short pole 50 with a U-shaped cradle 52 on top and integrated tie-down straps 54. Once the pole is securely tied down to the cradles of the dollies, the pole serves as a structural member, and the entire pole and dolly assembly acts like a vehicle. The dollies must be of sufficient height to allow adequate clearance for the pole base not to hit the ground. For long distance highway travel, the pole-dolly assembly should be loaded onto a transport trailer with high-speed travel rating. Each dolly should have lockable wheels for safely resting on sloped surfaces.

When the pole-dolly assembly reaches its destination, the tie-downs are removed. The base end of the pole is lowered to the ground and the base-end dolly removed. The resulting configuration is shown in FIG. 11. The top-end dolly remains in place as shown to assist in the erection of the pole.

To lift the pole up, the force applied manually is up and towards the base member. The horizontal component of the force vector tends to push the base member horizontally. When the frictional resistance at the pivot edge is not sufficient relative to the horizontal force vector, the entire pole and base will just skid along, defeating the erection effort.

Let's have a closer look at the frictional resistance at the pivot edge. Since equipment such as lights, cameras, and solar panels are typically mounted at the upper portion of a pole, the weight at the base member is relatively light. Resulting in small downward force on the pivot edge at the base member. In addition, the surface contact area at the pivot edge is very small, the surface frictional resistance at the pivot edge is therefore minimal. Unless the surface frictional coefficient is very high, or the ground is significantly uphill, the pivot edge will not pivot. It becomes simply a skid edge.

To immobilize the edge so that it acts as a pivot, an anti-skid mat 44 can be placed under the edge. Any materials with high frictional coefficient, such as rubber sheet, can effectively serve as an anti-skid mat. After the pole is erected, the mat is removed from under the base member.

To understand the importance of the adaptive counter weight system employed in this invention and how it works, one must examine the condition existing when the pole is in upright position ready to be lowered. In this position, the weight of the pole and its mounted equipment is directly down the pole and a small lateral pull force will be sufficient to tilt the pole sideways to lower it. However, once the pole starts rotating downward, the moment arm of the center of gravity of the pole in relation to the pivot edge increases very rapidly, creating a huge bending moment. A person attempting to stop the pole from crashing down may risk serious injury.

A larger counter bending moment generated by an adequate counter weight is necessary to allow a safe controlled descent of the pole by a person standing underneath it. However, this same heavy counter weight may make it impossible for one person to initiate tilting of the pole down from its upright position.

The innovative adaptive counter weight system of this invention effectively addresses the problem. The term "adaptive" is used because when the pole is in upright position, it will essentially add no counter weight so that one person can easily start rotating the pole downward; yet the counter weight will come into play and be effective when it is needed to safely counter balance the large downward bending moment. This is very important. Without it, other complicated and expensive mechanical means will be needed to allow a single person to lower the pole safely.

The adaptive counter weight system incorporates a counter weight arm which is connected to the base member. The counter weight is connected to the tip of the counter weight arm by a flexible connector. The length of the flexible counter determines how soon the counter weight kicks in or becomes effective during the pole lowering operation. This flexible connector provides the needed slack to delay the counter weight from being activated until it is needed. That is, the counter weight does not apply forces to said base member until the pole has been tilted to a predetermined degree of inclination from vertical. Any strong flexible materials that can provide slack will work, such as rope, cable or chain. For best implementation, particularly for heavy poles, it is preferred that the flexible connector be in the form of a block and tackle pulley system that offers significant mechanical advantage and easy load lock capability.

To illustrate, the block and tackle pulley system is set to provide a predetermined appropriate flexible connector length and securely locked when the pole is vertical. When the pole is initially tipped about the base member to begin lowering of the pole, the counter weight will become effective and rise from the ground at some point during the lowering process when the flexible connector becomes taut. After the pole is lowered, as shown in FIG. 11, the counter weight will be hanging in the air. To lower it, the operator simply unlocks the pulley system. With the built-in mechanical advantage in the pulley system, the counter weight can be lowered to the ground gently in a controlled manner. After unhooking the block and tackle from the tip of the counter weight arm, the arm can be removed from the base member and the pole loaded back to the pole dolly for transportation.

Figure 14:
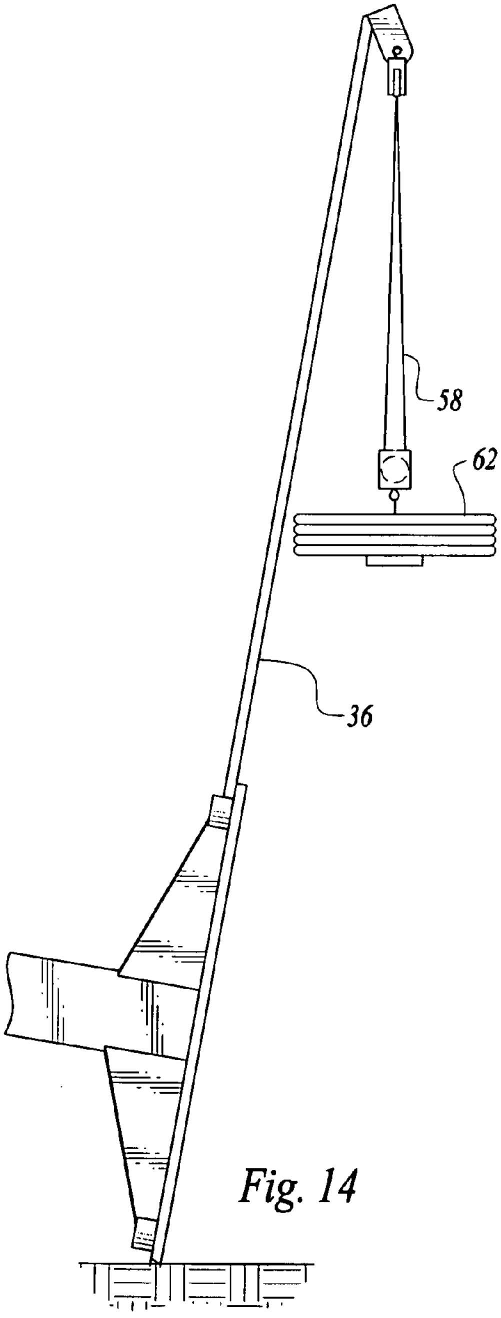
FIG. 14 is a view similar to FIG. 13, but illustrating the counter weight suspended from a rigid connector arm, rather than a bendable connector arm.

FIG. 14 shows an arrangement wherein the counter weight arm 36 is rigid. A cable or rope between the distal end of arm 36 and counter weight 62 is part of a block and tackle pulley system 58.

Figure 13:
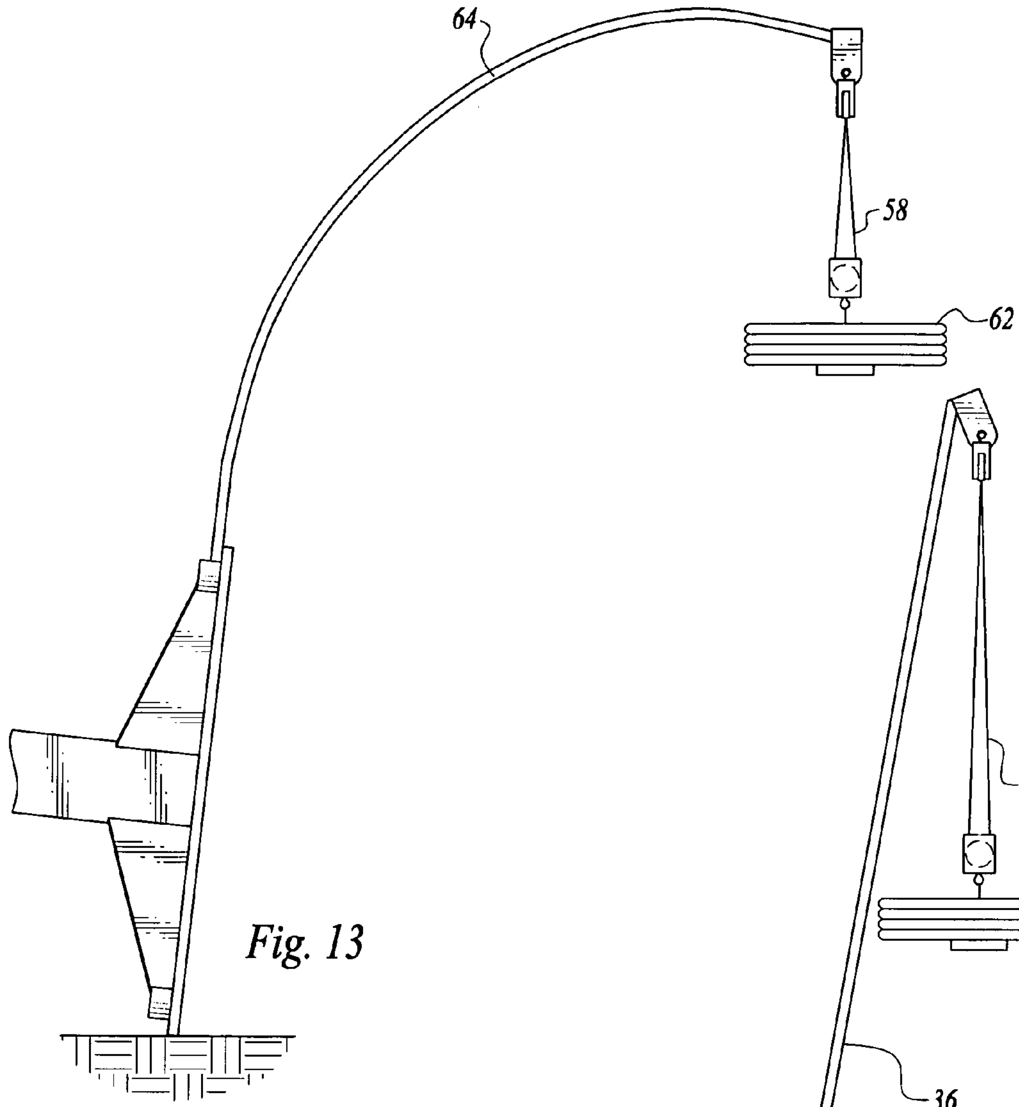
FIG. 13 is an enlarged view of the arrangement shown in FIG. 11 and illustrating the base member, the bendable counter weight arm and the counter weight suspended by a block and tackle system.

The counter weight arm can be a metal rigid rod or tube; however, solid fiberglass rod is believed to be the best material for this application. Since it is flexible, it can create a unique progressive counter weight and enhance the length of the moment arm. See FIGS. 11 and 13 illustrating bendable arm 64. These two characteristics are ideal for the subject installation system. As the counter weight is engaged, the fiberglass rod or arm will bend first, thus "easing in" the force of the counter weight for a smooth operation. This action is similar to a fiberglass fishing rod. The bending of the fiberglass arm also creates a longer moment arm than a rigid metal arm, making it structurally more efficient for generating larger counter bending moment. Lastly, a fiberglass arm or rod is much lighter than its metal counterpart and therefore adds very little weight to the initial pole tilting effort when lowering the pole.

For raising the pole, use of the adaptive counter weight system is usually not absolutely necessary. Counter weights can be directly added to the end of a rigid arm. However, the counter weight system described above for lowering the pole is far more superior for raising the pole as well. First, the enhanced moment arm from the fiberglass rod is more efficient. Second, the progressive reduction of counter weight to zero by the flexible fiberglass rod and the flexible block and tackle connector creates a smooth operation without over-counterweight towards the end when the pole is almost upright. Third, the mechanical advantage of the block and tackle makes it easy to hoist the counter weight up. Lastly, it greatly simplifies operation when the counter weight system is the same for erecting and lowering the pole.

Once the pole is erected, anchor bolts can be installed to secure the base member. A variety of anchor bolts are available. For example, after pilot holes are drilled, some anchor bolts can be directly screwed into concrete or asphalt surfaces with a power impact wrench, greatly simplifying anchor installation. For anchoring into dirt, earth anchors or earth screws can be installed with an impact wrench.

For existing concrete or asphalt surfaces that are not level, spacers can be placed under the base member. If the base member is properly designed, filling the voids under the base member with structural foam is not necessary. For sloped or uneven soil surfaces, a level pad can first be created prior to installing earth anchors and raising the pole. Since most pole bases are not large, creating a small level dirt pad is a very easy task.

Figure 17:
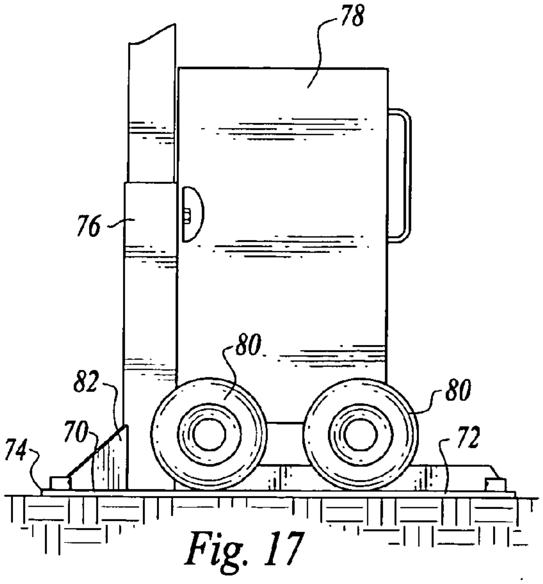
FIG. 17 shows the enlarged base member portion of the asymmetrical base member supporting a weight in the form of a wheeled equipment box.
Figure 16:
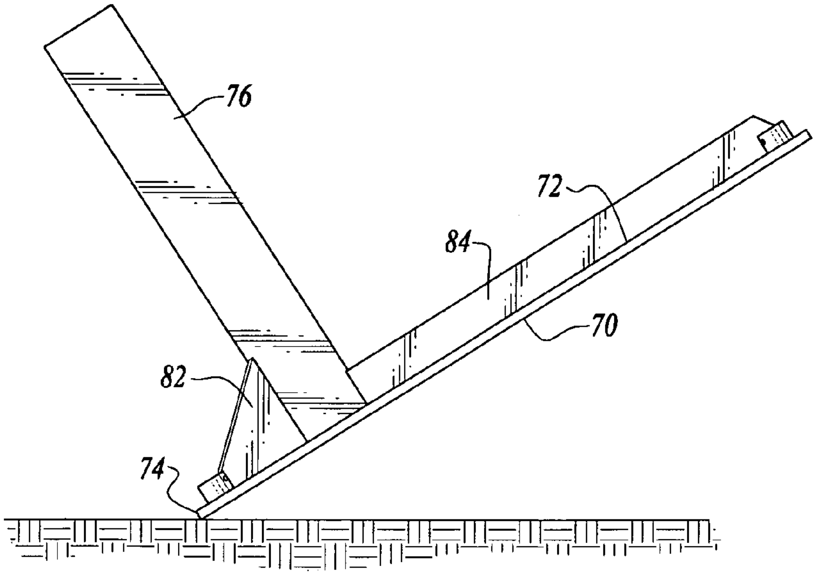
FIG. 16 is a side, elevational view illustrating the base member of FIG. 15 tilting on edge while supported by the ground or other support surface.
Figure 15:
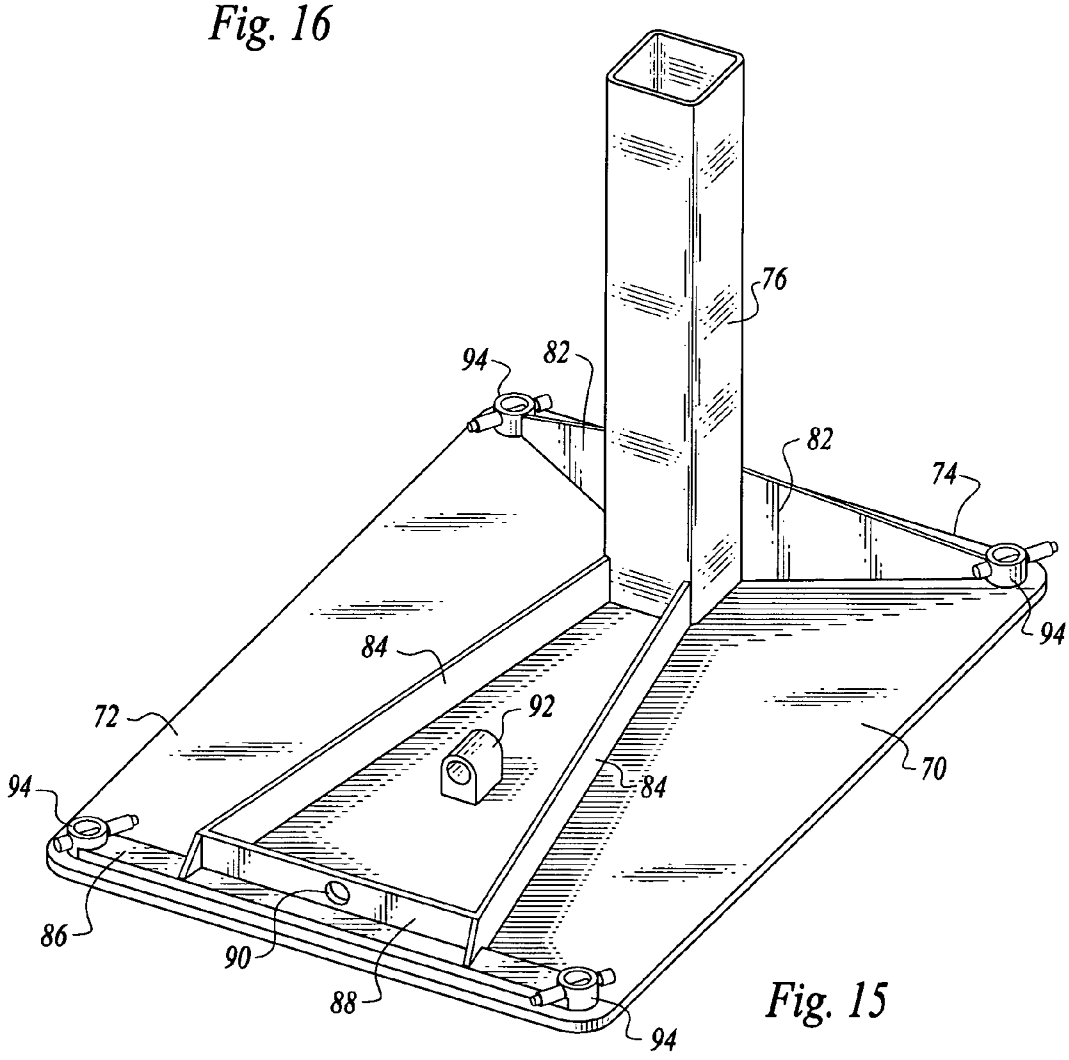
FIG. 15 is a view similar to FIG. 1, but illustrating an embodiment of the invention wherein the base member is asymmetrical and includes an enlarged base member portion.

FIGS. 15-17 illustrate another embodiment of the invention.

In this embodiment, the base member 70 is asymmetrical and includes an enlarged base portion 72 located in opposition to pivot edge segment 74. The enlarged base portion and the pivot edge segment are positioned on opposite sides of pole base 76 and any pole positioned therein. The upper surface of the enlarged base portion 72 is used to support a weight. The weight, as shown in FIG. 17 is in the form of an equipment box 78 having wheels 80. This unique innovation has important additional benefits. It is particular useful for pole systems that naturally require equipment boxes of significant weight, such as in applications for security and communication systems. For example, equipment and back-up power including battery banks are housed inside a rollable equipment box, which becomes the additional weight resting on the base member of the pole system, with cameras or communication antennae mounted on the top of the pole.

In terms of additional benefits, first, the rollable weight reduces the forces on any anchor bolts employed. If a pole is not tall and the wind load area on it is not large, anchor bolts may not be necessary even in high wind conditions. At a minimum, since the load on the anchor bolts are reduced significantly, it becomes easier to install a pole on poor soil condition without a large base. The rollable weight is one simple way to move weight around quickly without the need of a crane. Moreover, it makes it easier to secure the weight to the pole base and/or base member to reduce or avoid theft or vandalism.

Second, the asymmetrical base member acts as an effective built-in counter weight to assist raising and lowering of the pole member after the equipment box is removed therefrom. See FIG. 16. When a pole is relative short and light, no additional external counter weight system is necessary, which significantly simplifies and speeds up installation. For a light weight pole system, in which one person can tilt the pole with the assistance of just the built-in counter weight on the base member, the need for adaptive counter weight becomes a non-issue.

As a result, for light and short poles, a truly simple and highly portable pole system becomes a reality. One only needs to tilt up the pole with the help of the asymmetrical base member, roll the equipment box onto the enlarged base portion and securely attach the box to the pole to complete installation. Anchor bolts become optional, except for security purposes, making this embodiment ideal for many temporary applications.

For tall poles or those with heavy equipment such as solar panels mounted on them, the adaptive counter weight system described above may need to be used in conjunction with the asymmetrical base member, and the rollable weight is still beneficial for reducing the load on the anchor bolts and allowing the system to be installed in more challenging site conditions.

The asymmetrical base member can be a variety of shapes as long as it provides a stable pivot for the pole system and has adequate space to accommodate the rollable weight. In most situations, this means that the pole is offset relative to the center of the base member. The base 70 shown in FIG. 15 is rectangular with the pole base being offset between two base member ends.

Structural bracing at the pole base is provided by gusset plates 82 and stiffeners. On the rollable weight side, typical gusset plates connecting the bottom of the pole to the anchor points will not be employed since they will obstruct the wheels of the rollable weight. Instead, two low profile stiffener members 84 that stay within the clearance of the wheels and under the rollable weight are used. Parts of the loads of these two stiffener members are further transferred to a flat lay stiffener 86 that leads to the nearby anchor bolts. The flat stiffener cannot be too thick so that the wheels can easily jump over it.

One additional auxiliary stiffener 88 is added to further strengthen the mid section of the flat stiffener 86, and a hole 90 in its center acts as a restraint bracket to the counter weight arm (not shown) if one is employed. A receiving pocket or receptacle 92 is spaced further on to secure the counter weight arm or rod. On the opposite side of the pole the two conventional gusset plates 82 brace between the pole base and two anchor rings or projections 94. The rings or upwardly extending projections 94 around the anchor bolt holes (not shown) in the base plate serve effectively for load transfer to the anchor bolts and act as bolt protectors, lock pins being inserted across the rings, as shown, to block unauthorized access to the anchor bolts.

As discussed above, a practical rollable weight is in the form of an equipment box that is part of and utilized in the application of the pole system. To avoid tampering, the box should be bolted in place to the pole or base member from inside of the box. Once the equipment box door is closed and locked, the contents of the box are protected and the entire system is secured. If necessary, additional weight can be added to the box to make it heavier.

Under wind load, the pole will tilt, which in turn will cause the base member to tilt along with it. Since the rollable weight is sitting on the base member, the gravity force of the weight will counteract the base rotation. Therefore, the loads on the anchor bolts are reduced because of the rollable weight. If the maximum wind force on the pole system is lighter than the counterrotational force from the rollable weight, anchor bolts are not necessary. When anchor bolts are needed, the heavier the rollable weight, the greater the load reduction on the anchor bolts.

The invention claimed is:

1. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole;

counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment, said base member being asymmetrical and including an enlarged base member portion, said enlarged base member portion at least partially comprising said counter weight structure and located in opposition to said pivot edge segment, and said enlarged base member portion and said pivot edge segment positioned at opposite sides of said pole; and a weight positioned on and supported by said enlarged base member portion to maintain said pole in a vertical orientation, said weight being selectively removable from said enlarged base member portion to facilitate tilting of the base member about said pivot edge segment.

2. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole; and counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment, said counter weight structure including a counter weight arm connecting said counter weight arm to said base member with said counter weight arm extending outwardly beyond the outer peripheral edge of said base member in a direction away from said pivot edge segment and said pole, and a counter weight connected to said counter weight arm at a location on said counter weight arm spaced from said base member.

3. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, said counter weight structure including a counter weight arm, said method including the additional step of utilizing an arm connector to connect said counter weight arm to said base member with said counter weight arm extending outwardly beyond the outer peripheral edge of said base member in a direction away from said pivot edge segment and said pole, and the method further including the additional step of connecting a counter weight to said counter weight arm at a location on said counter weight arm spaced from said base member.

4. The pole installation apparatus according to claim 1 additionally including wheels operatively associated with said weight for facilitating movement of said weight relative to said enlarged base member portion.

5. The pole installation apparatus according to claim 1 wherein said weight includes an equipment box.

6. The pole installation apparatus according to claim 2 wherein said counter weight arm and said counter weight are connected by a flexible connector.

7. The pole installation apparatus according to claim 2 wherein said counter weight arm is substantially rigid.

8. The pole installation apparatus according to claim 2 wherein said counter weight arm is bendable and has an elastic memory.

9. The pole installation apparatus according to claim 6 wherein said flexible connector is an adjustable length flexible connector.

10. The pole installation apparatus according to claim 9 wherein said adjustable length flexible connector is a block and tackle pulley system.

11. The pole installation apparatus according to claim 1 wherein said pole includes a pole base attached to said base member and connected to the lower end of said pole, said base member including spaced stiffener members attached to and extending along the enlarged base member portion to said pole base and an auxiliary stiffener member extending between said spaced stiffener members, said spaced stiffener members and said auxiliary stiffener member being of a size and shape selected so as not to interfere with movement of said weight on said enlarged base member portion.

12. The pole installation apparatus according to claim 11 additionally including a counter weight arm receptacle attached to said enlarged base member portion within the confines of said spaced stiffener members and said auxiliary stiffener member for receiving an end of a counter weight arm.

13. The pole installation apparatus according to claim 12 wherein said auxiliary stiffener member defines a hole for accommodating a counter weight arm connected to said base member by said counter weight arm receptacle.

14. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, the attached base member being asymmetrical and including an enlarged base member portion, said enlarged base member portion at least partially comprising said counter weight structure and being located in opposition to said pivot edge segment, and said enlarged base member portion and said pivot edge segment being positioned at opposite sides of said pole, and said counter weight structure being further comprised of a weight positioned on and supported by said enlarged base member portion, said weight being selectively movably positionable between alternate positions on said enlarged base member portion.

15. The method according to claim 14 including the step of operatively associating wheels with said weight for facilitating movement of said weight relative to said enlarged base member portion.

16. The method according to claim 14 including the step of employing an equipment box and contents, if any, of the equipment box as the weight.

17. The method according to claim 3 including the step of employing a flexible connector to connect said counter weight arm and said counter weight, the weight of said counter weight not being applied to said base member until said flexible connector becomes taut.

18. The method according to claim 3 wherein said counter weight arm is substantially rigid.

19. The method according to claim 3 wherein said counter weight arm is bendable and has an elastic memory.

20. The method according to claim 17 wherein said flexible connector is an adjustable length flexible connector.

21. The method according to claim 20 wherein said adjustable length flexible connector is a block and tackle pulley system.

22. The method according to claim 14 wherein a pole base is attached to said base member and connected to the lower end of said pole, said base member including spaced stiffener members attached to and extending along the enlarged base member portion to said pole base and an auxiliary stiffener member extending between said spaced stiffener members, said spaced stiffener members and said auxiliary stiffener member being of a size and shape selected so as not to interfere with movement of said weight on said enlarged base member portion.

23. The method according to claim 22 additionally including a counter weight arm receptacle attached to said enlarged base member portion within the confines of said spaced stiffener members and said auxiliary stiffener member for receiving an end of a counter weight arm.

24. The method according to claim 23 wherein a hole is formed in said auxiliary stiffener member for accommodating a counter weight arm connected to said base member by said counter weight arm receptacle.

25. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole; and counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment, said pivot edge segment being substantially straight and extending substantially orthogonal relative to the primary axis of said pole.

26. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole;

counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment; and a pair of stabilizers spaced from one another and projecting beyond said outer peripheral edge, said pivot edge segment being positioned between said stabilizers, said stabilizers and said pivot edge segment having aligned extremities.

27. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole;

counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment; and a pair of unconnected wheeled dollies for selectively either jointly or separately supporting said pole when said pole is not in the vertical orientation.

28. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole; and counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment, said base member defining anchor bolt holes, said anchor bolt holes surrounded by upwardly extending projections affixed to said base member for receiving lock pins to prevent ready access to any anchor bolts in said anchor bolt holes.

29. Pole installation apparatus allowing installation of a pole at a site without requiring use of foundations or anchor poles, said apparatus including, in combination:

an elongated pole having an upper end, a lower end and a primary axis extending between said upper and lower ends;

a base member attached to the lower end of said elongated pole for supporting said elongated pole, said base member including an outer peripheral edge having a pivot edge segment forming a stable support pivot extending substantially orthogonally relative to the primary axis of said pole;

counter weight structure incorporated in or connected to said base member at a location spaced from said pivot edge segment for applying forces to said base member at least partially countering the forces exerted by gravity on said pole during movement of said pole between a vertical orientation and a horizontal orientation and tilting of said pole about said pivot edge segment; and an anti-skid mat positionable under said pivot edge segment to resist sliding of the base member during tilting of said pole about said pivot edge segment.

30. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, said pivot edge segment being substantially straight and extending substantially orthogonally relative to the primary axis of said pole.

31. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, a pair of stabilizers spaced from one another and projecting beyond said outer peripheral edge, said pivot edge segment being positioned between said stabilizers, said stabilizers and said pivot edge segment having extremities aligned.

32. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment; and selectively employing a pair of unconnected wheeled dollies either jointly or separately to support said pole when said pole is not in the vertical orientation.

33. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, and said base member defining anchor bolt holes, said anchor bolt holes surrounded by upwardly extending projections affixed to said base member for receiving lock pins to prevent ready access to any anchor bolts in said anchor bolt holes.

34. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment; and utilizing the counter weight structure to apply forces to said base member at least partially countering the forces exerted by gravity on said pole during movement of said pole between a vertical orientation and a horizontal orientation and tilting of said pole about said pivot edge segment, the counter weight structure not utilized to apply forces to said base member until said pole has been tilted to a predetermined degree of inclination from vertical.

35. A method of installing an elongated pole having an upper end, a lower end and a primary axis extending between said upper and lower ends at a site without requiring use of foundations or anchor poles, said method comprising the steps of:

attaching a base member to the lower end of said elongated pole for supporting said elongated pole, said base member including an outer peripheral edge having a pivot edge segment forming a stable support pivot extending substantially orthogonally relative to the primary axis of said pole;

providing counter weight structure incorporated in or connected to said base member at a location spaced from said pivot edge segment;

utilizing the counter weight structure to apply forces to said base member at least partially countering the forces exerted by gravity on said pole during movement of said pole between a vertical orientation and a horizontal orientation and tilting of said pole about said pivot edge segment; and positioning an anti-skid mat under said base member to resist sliding of the base member during tilting of said pole about said pivot edge segment.

* * * * *